United States Patent
Wu et al.

(10) Patent No.: US 11,425,747 B2
(45) Date of Patent: Aug. 23, 2022

(54) METHOD, APPARATUS, COMPUTER PROGRAM PRODUCT AND COMPUTER PROGRAM

(71) Applicant: Nokia Technologies Oy, Espoo (FI)

(72) Inventors: Chunli Wu, Beijing (CN); Benoist Pierre Sebire, Tokyo (JP); Samuli Heikki Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/641,568

(22) PCT Filed: Sep. 28, 2017

(86) PCT No.: PCT/CN2017/104045
§ 371 (c)(1),
(2) Date: Feb. 24, 2020

(87) PCT Pub. No.: WO2019/061174
PCT Pub. Date: Apr. 4, 2019

(65) Prior Publication Data
US 2020/0187235 A1    Jun. 11, 2020

(51) Int. Cl.
*H04W 72/12*    (2009.01)
*H04W 28/02*    (2009.01)
(Continued)

(52) U.S. Cl.
CPC ... *H04W 72/1284* (2013.01); *H04W 28/0252* (2013.01); *H04W 28/0278* (2013.01);
(Continued)

(58) Field of Classification Search
CPC ......... H04W 72/1284; H04W 28/0252; H04W 28/0278; H04W 28/06; H04W 72/0413;
(Continued)

(56) References Cited

U.S. PATENT DOCUMENTS 8,942,124 B2 * 1/2015 Marchand ......... H04W 28/0278
370/252
9,451,600 B2    9/2016 Park et al.
(Continued)

FOREIGN PATENT DOCUMENTS

CN    102291760 A    12/2011
CN    102612143 A    7/2012
(Continued)

OTHER PUBLICATIONS

Extended European Search Report for Application No. 17926839.6, dated Apr. 8, 2021, 7 pages.
(Continued)

*Primary Examiner* — German Viana Di Prisco
(74) *Attorney, Agent, or Firm* — Brake Hughes Bellermann LLP

(57) ABSTRACT

The disclosure relates a method comprising: determining that buffered data is available for transmission and cannot be transmitted over allocated resources; and causing information indicating that buffered data is available for transmission and cannot be transmitted over allocated resources to be transmitted over the allocated resources.

7 Claims, 11 Drawing Sheets

(51) Int. Cl.
*H04W 28/06* (2009.01)
*H04W 72/04* (2009.01)
*H04W 72/10* (2009.01)
*H04W 80/08* (2009.01)

(52) U.S. Cl.
CPC ....... *H04W 28/06* (2013.01); *H04W 72/0413* (2013.01); *H04W 72/0473* (2013.01); *H04W 72/0486* (2013.01); *H04W 72/10* (2013.01); *H04W 80/08* (2013.01)

(58) Field of Classification Search
CPC ......... H04W 72/0473; H04W 72/0486; H04W 72/10; H04W 80/08
USPC .................... 370/329, 310.2; 455/550.1, 450
See application file for complete search history.

(56) References Cited

U.S. PATENT DOCUMENTS

| | | | |
|---|---|---|---|
| 2009/0175214 A1* | 7/2009 | Star ................. | H04B 7/15592 370/315 |
| 2009/0197610 A1 | 8/2009 | Chun et al. | |
| 2011/0026625 A1 | 2/2011 | Susitaival et al. | |
| 2011/0255492 A1* | 10/2011 | Dai .................. | H04W 72/1284 370/329 |
| 2015/0110040 A1* | 4/2015 | Zhao ................. | H04W 24/10 370/329 |
| 2015/0282213 A1* | 10/2015 | Sun .................. | H04W 74/0833 370/329 |
| 2016/0080116 A1* | 3/2016 | Bucknell ........... | H04W 72/1284 370/329 |
| 2016/0157268 A1* | 6/2016 | Wakabayashi ........ | H04W 24/10 370/329 |
| 2017/0311317 A1* | 10/2017 | Dinan ............... | H04W 72/0486 |
| 2017/0325255 A1* | 11/2017 | Xu .................. | H04L 43/00 |
| 2017/0373789 A1* | 12/2017 | Huang ............... | H04B 7/0452 |
| 2018/0139724 A1* | 5/2018 | Loehr ................ | H04W 72/02 |
| 2018/0227941 A1* | 8/2018 | Zhang ............... | H04W 72/0413 |
| 2018/0338320 A1* | 11/2018 | Fodor ................ | H04W 72/1284 |
| 2019/0320339 A1* | 10/2019 | Laselva ............. | H04W 52/246 |
| 2020/0178282 A1* | 6/2020 | Yi ................... | H04W 72/1284 |
| 2021/0058328 A1* | 2/2021 | Xu .................. | H04W 72/0446 |
| 2021/0058939 A1* | 2/2021 | Chandran ........... | H04W 72/10 |

FOREIGN PATENT DOCUMENTS

| | | |
|---|---|---|
| CN | 102740483 A | 10/2012 |
| EP | 2675081 A1 | 12/2013 |
| TW | 201001938 A | 1/2010 |
| TW | 201707491 A | 2/2017 |
| WO | 2012/097694 A1 | 7/2012 |
| WO | 2014/181177 A1 | 11/2014 |
| WO | 2015099321 A1 | 7/2015 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321, V14.3.0, Jun. 2017, pp. 1-107.

"UL Skipping with LCH Restriction", 3GPP TSG-RAN WG2 meeting #99bis, R2-17xxxxx, Agenda: x.x.x, Nokia, Oct. 9-13, 2017, 2 pages.

"3rd Generation Partnership Project; Technical Specification Group Radio Access Network; NR; Medium Access Control (MAC) protocol specification (Release 15)", 3GPP TS 38.321, V1.0.0, Sep. 2017, 47 pages.

International Search Report and Written Opinion received for corresponding Patent Cooperation Treaty Application No. PCT/CN2017/104045, dated Jun. 27, 2018, 9 pages.

"Running CR for Introduction of Shortened TTI and Processing Time for LTE", 3GPP TSG-RAN2 meeting #99, R2-1708613, Ericsson, Aug. 21-25, 2017, 60 pages.

"3rd Generation Partnership Project; Technical Specification Group Radio Access Network; NR; NR and NG-RAN Overall Description; Stage 2 (Release 15)", 3GPP TS 38.300, V15.2 0, Jun. 2018, 87 pages.

Tentative Rejection received for corresponding Taiwan Patent Application No. 107133926, dated Aug. 12, 2019, 3 pages of Tentative Rejection and 2 pages of translation available.

* cited by examiner

METHOD, APPARATUS, COMPUTER PROGRAM PRODUCT AND COMPUTER PROGRAM

RELATED APPLICATION

This application was originally filed as PCT Application No. PCT/CN2017/104045 filed Sep. 28, 2017.

FIELD OF THE INVENTION

The invention relates to a method, an apparatus, a computer program product and a computer program.

BACKGROUND

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or Wi-Fi). Wi-Fi is often used synonymously with WLAN. The wireless systems can be divided into cells, and are therefore often referred to as cellular systems.

A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. An example of standardized communication system architectures is the long-term evolution (LTE) of the Universal Mobile Telecommunications System (UMTS) radio-access technology. The LTE has been and is being standardized by the 3rd Generation Partnership Project (3GPP). The LTE employs the Evolved Universal Terrestrial Radio Access Network (E-UTRAN) access. Further development of LTE are sometimes referred to as LTE Advanced (LTE-A). The current 3GPP standardization effort is directed to what is termed as the 5th Generation (5G) system. The 5G system is sometimes referred to as NR (new radio).

SUMMARY

There is provided, in a first aspect, a method comprising: determining that buffered data is available for transmission and cannot be transmitted over allocated resources; and causing information indicating that buffered data is available for transmission and cannot be transmitted over allocated resources to be transmitted over the allocated resources.

The information may include a buffer status report.

The buffered data may be associated with a logical channel.

The determining may be based on a logical channel prioritization function.

The logical channel prioritization function may be configured with at least one logical channel mapping restriction a type of allocated resources.

The determining may be based on a type of the allocated resources.

The determining may be performed by a MAC entity.

The determining may be based on processing limitations at the MAC entity.

The determining is based on processing limitations at an upper layer entity.

The upper layer entity may be an RLC entity.

The upper layer entity may be a PDCP entity.

The method may further comprise: causing a counter to be set.

The method may further comprise: causing the counter to be updated upon transmitting the information over the allocated resources.

The method may further comprise: causing a timer to be set.

The method may further comprise: causing the timer to be triggered upon transmitting the information over the allocated resources.

The determining may be based on power limitations.

The information may include at least one indication for the determining.

There is provided, in a first aspect, a method comprising: determining allocated resources to receive buffered data available for transmission; and causing information indicating that buffered data is available for transmission and cannot be transmitted over allocated resources to be received over the allocated resources.

The method may further comprise: causing at least one action to be taken based on the information.

The information may include a buffer status report.

The information may include at least one indication for determining that buffered data is available for transmission and cannot be transmitted over allocated resources.

The at least one indication may indicate a logical channel prioritization function.

The at least one indication may indicate processing limitations.

The at least one indication may indicate power limitations.

The at least one action may include decreasing, maintaining or increasing the allocated resources.

The at least one action may include maintaining or changing a type of the allocated resources.

There is provided, in a third aspect, an apparatus comprising: means for determining that buffered data is available for transmission and cannot be transmitted over allocated resources; and means for causing information indicating that buffered data is available for transmission and cannot be transmitted over allocated resources to be transmitted over the allocated resources.

The information may include a buffer status report.

The buffered data may be associated with a logical channel.

The means for determining may be based on a logical channel prioritization function.

The logical channel prioritization function may be configured with at least one logical channel mapping restriction a type of allocated resources.

The means for determining may be based on a type of the allocated resources.

The means for determining may be performed by a MAC entity.

The means for determining may be based on processing limitations at the MAC entity.

The means for determining is based on processing limitations at an upper layer entity.

The upper layer entity may be an RLC entity.

The upper layer entity may be a PDCP entity.

The apparatus may further comprise: means for causing a counter to be set.

The apparatus may further comprise: means for causing the counter to be updated upon transmitting the information over the allocated resources.

The apparatus may further comprise: means for causing a timer to be set.

The apparatus may further comprise: means for causing the timer to be triggered upon transmitting the information over the allocated resources.

The means for determining may be based on power limitations.

The information may include at least one indication for the determining.

There is provided, in a fourth aspect, an apparatus comprising: means for determining allocated resources to receive buffered data available for transmission; and means for causing information indicating that buffered data is available for transmission and cannot be transmitted over allocated resources to be received over the allocated resources.

The apparatus may further comprise: means for causing at least one action to be taken based on the information.

The information may include a buffer status report.

The information may include at least one indication for determining that buffered data is available for transmission and cannot be transmitted over allocated resources.

The at least one indication may indicate a logical channel prioritization function. The at least one indication may indicate processing limitations.

The at least one indication may indicate power limitations.

The at least one action may include decreasing, maintaining or increasing the allocated resources.

The at least one action may include maintaining or changing a type of the allocated resources.

There is provided, in a fifth aspect, an apparatus comprising at least one processor and at least one memory including a computer program code, the at least one memory and the computer program code configured to, with the at least one processor, cause the apparatus at least to: determine that buffered data is available for transmission and cannot be transmitted over allocated resources; and cause information indicating that buffered data is available for transmission and cannot be transmitted over allocated resources to be transmitted over the allocated resources.

The information may include a buffer status report.

The buffered data may be associated with a logical channel.

The determining may be based on a logical channel prioritization function.

The logical channel prioritization function may be configured with at least one logical channel mapping restriction a type of allocated resources.

The determining may be based on a type of the allocated resources.

The determining may be performed by a MAC entity.

The determining may be based on processing limitations at the MAC entity.

The determining is based on processing limitations at an upper layer entity.

The upper layer entity may be an RLC entity.

The upper layer entity may be a PDCP entity.

The at least one processor, may further cause the apparatus at least to: cause a counter to be set.

The at least one processor, may further cause the apparatus at least to: cause the counter to be updated upon transmitting the information over the allocated resources.

The at least one processor, may further cause the apparatus at least to: cause a timer to be set.

The at least one processor, may further cause the apparatus at least to: cause the timer to be triggered upon transmitting the information over the allocated resources.

The determining may be based on power limitations.

The information may include at least one indication for the determining.

There is provided, in a sixth aspect, an apparatus comprising at least one processor and at least one memory including a computer program code, the at least one memory and the computer program code configured to, with the at least one processor, cause the apparatus at least to: determine allocated resources to receive buffered data available for transmission; and cause information indicating that buffered data is available for transmission and cannot be transmitted over allocated resources to be received over the allocated resources.

The least one processor, may further cause the apparatus at least to: cause at least one action to be taken based on the information.

The information may include a buffer status report.

The information may include at least one indication for determining that buffered data is available for transmission and cannot be transmitted over allocated resources.

The at least one indication may indicate a logical channel prioritization function.

The at least one indication may indicate processing limitations.

The at least one indication may indicate power limitations.

The at least one action may include decreasing, maintaining or increasing the allocated resources.

The at least one action may include maintaining or changing a type of the allocated resources.

There is provided, in a seventh aspect, a computer program product for a computer, comprising software code portions for: determining that buffered data is available for transmission and cannot be transmitted over allocated resources; and causing information indicating that buffered data is available for transmission and cannot be transmitted over allocated resources to be transmitted over the allocated resources.

The information may include a buffer status report.

The buffered data may be associated with a logical channel.

The determining may be based on a logical channel prioritization function.

The logical channel prioritization function may be configured with at least one logical channel mapping restriction a type of allocated resources.

The determining may be based on a type of the allocated resources.

The determining may be performed by a MAC entity.

The determining may be based on processing limitations at the MAC entity.

The determining is based on processing limitations at an upper layer entity.

The upper layer entity may be an RLC entity.

The upper layer entity may be a PDCP entity.

The computer program product for a computer, may further comprise software code portions for: causing a counter to be set.

The computer program product for a computer, may further comprise software code portions for: causing the counter to be updated upon transmitting the information over the allocated resources.

The computer program product for a computer, may further comprise software code portions for: causing a timer to be set.

The computer program product for a computer, may further comprise software code portions for: causing the timer to be triggered upon transmitting the information over the allocated resources.

The determining may be based on power limitations.

The information may include at least one indication for the determining.

There is provided, in an eight aspect, a computer program product for a computer, comprising software code portions for: determining allocated resources to receive buffered data available for transmission; and causing information indicating that buffered data is available for transmission and cannot be transmitted over allocated resources to be received over the allocated resources.

The computer program product for a computer, may further comprise software code portions for: causing at least one action to be taken based on the information.

The information may include a buffer status report.

The information may include at least one indication for determining that buffered data is available for transmission and cannot be transmitted over allocated resources.

The at least one indication may indicate a logical channel prioritization function.

The at least one indication may indicate processing limitations.

The at least one indication may indicate power limitations.

The at least one action may include decreasing, maintaining or increasing the allocated resources.

The at least one action may include maintaining or changing a type of the allocated resources.

There is provided, in a ninth aspect, computer program embodied on a non-transitory computer-readable storage medium, the computer program comprising program code for controlling a process to execute a process, the process comprising the steps of: determining that buffered data is available for transmission and cannot be transmitted over allocated resources; and causing information indicating that buffered data is available for transmission and cannot be transmitted over allocated resources to be transmitted over the allocated resources.

The information may include a buffer status report.

The buffered data may be associated with a logical channel.

The determining may be based on a logical channel prioritization function.

The logical channel prioritization function may be configured with at least one logical channel mapping restriction a type of allocated resources.

The determining may be based on a type of the allocated resources.

The determining may be performed by a MAC entity.

The determining may be based on processing limitations at the MAC entity.

The determining is based on processing limitations at an upper layer entity.

The upper layer entity may be an RLC entity.

The upper layer entity may be a PDCP entity.

The process may further comprise the step of: causing a counter to be set.

The process may further comprise the step of: causing the counter to be updated upon transmitting the information over the allocated resources.

The process may further comprise the step of: causing a timer to be set.

The process may further comprise the step of: causing the timer to be triggered upon transmitting the information over the allocated resources.

The determining may be based on power limitations.

The information may include at least one indication for the determining.

There is provided, in an tenth aspect, computer program embodied on a non-transitory computer-readable storage medium, the computer program comprising program code for controlling a process to execute a process, the process comprising the steps of: determining allocated resources to receive buffered data available for transmission; and causing information indicating that buffered data is available for transmission and cannot be transmitted over allocated resources to be received over the allocated resources.

The process may further comprise the step of: causing at least one action to be taken based on the information.

The information may include a buffer status report.

The information may include at least one indication for determining that buffered data is available for transmission and cannot be transmitted over allocated resources.

The at least one indication may indicate a logical channel prioritization function.

The at least one indication may indicate processing limitations.

The at least one indication may indicate power limitations.

The at least one action may include decreasing, maintaining or increasing the allocated resources.

The at least one action may include maintaining or changing a type of the allocated resources.

BRIEF DESCRIPTION OF THE DRAWING

Some embodiments will now be described in further detail, by way of example only, with reference to the following examples and accompanying drawings, in which.

DETAILED DESCRIPTION OF THE DRAWINGS

Before explaining in detail embodiments, certain general principles of a communication system, a mobile communication device and a control apparatus are briefly explained with reference to FIGS. 1 and 2 to assist in understanding the technology underlying the described invention.

Figure 1:
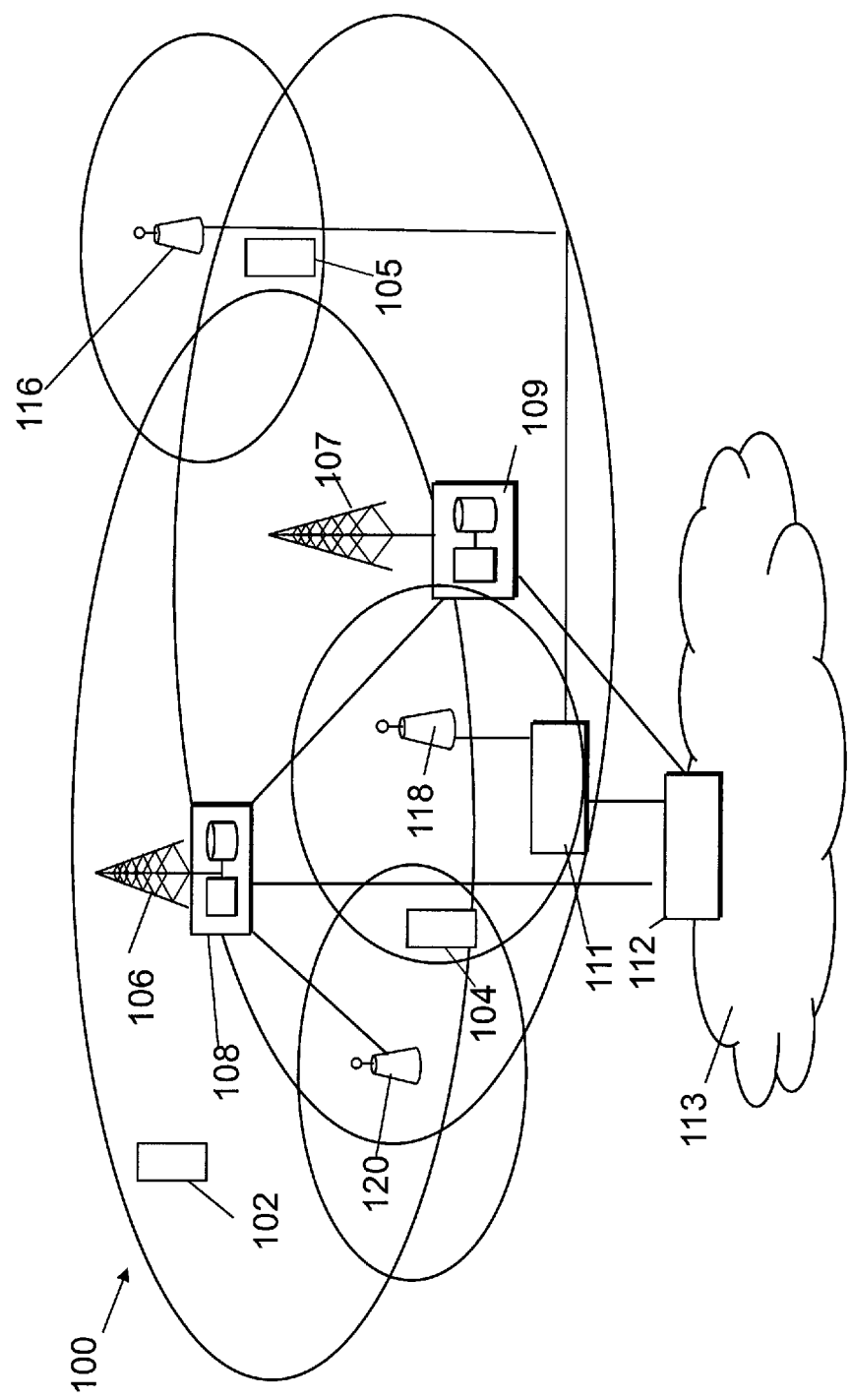
FIG. 1 illustrates a communication system.

In a wireless communication system 100, such as that shown in FIG. 1, wireless communication devices, for example, user equipments 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided via a separate entity such as a Radio Network Controller. In FIG. 1 control apparatus 108 and apparatus 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
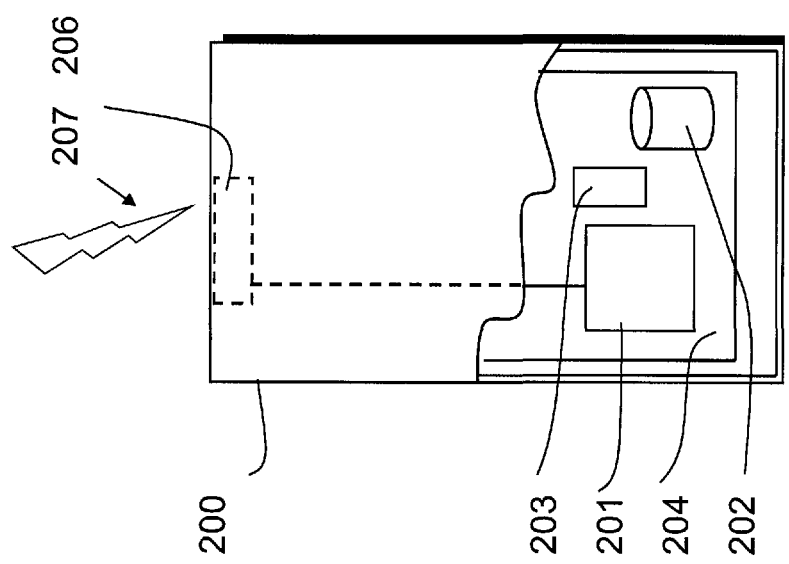
FIG. 2 illustrates a communication device.

A possible wireless communication device will now be described in more detail with reference to FIG. 2 showing a schematic, partially sectioned view of a communication device 200. Such a communication device is often referred to as an endpoint device. An appropriate communication device may be provided by any device capable of sending and receiving radio signals.

A communication device may be for example a mobile device, that is, a device not fixed to a particular location, or it may be a stationary device. The communication device may need human interaction for communication, or may not need human interaction for communication.

The communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A communication device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. Furthermore, a wireless communication device may comprise appropriate connectors (either wired or wireless) to other devices and/or for connecting external accessories. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced NodeBs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a communications system is the 5G concept. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

The base stations in 5G may be referred to as gNB.

Figure 3:
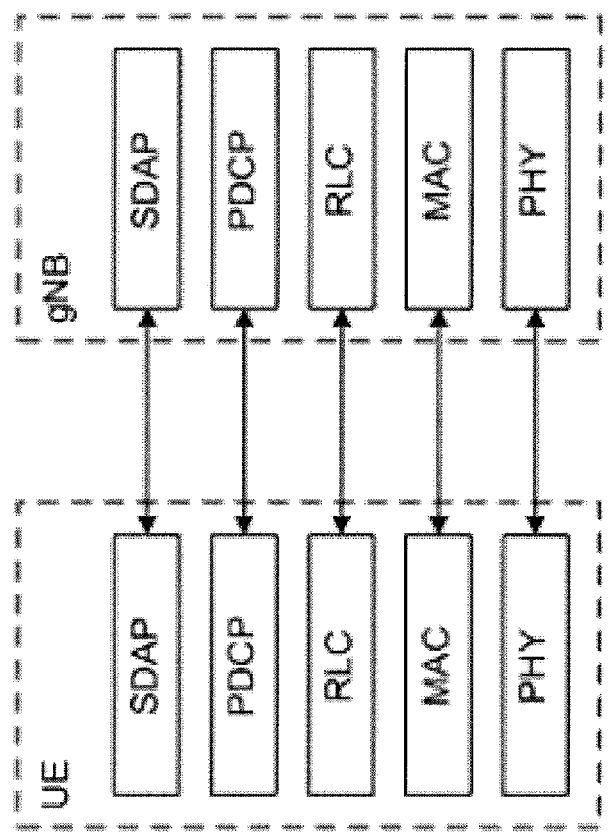
FIG. 3 illustrates a protocol stack for 5G NR.

FIG. 3 illustrates the 5G NR Radio protocol stack (user plane). The protocol stack comprises a physical layer (PHY), a medium access layer (MAC), a radio link control layer (RLC), a radio resource control (RRC), Packet Data Convergence Control layer (PDCP) and a service data adaptation protocol layer (SDAP).

The functions of the SDAP include mapping between a quality of service (QoS) flow and a data radio bearer and marking QoS flow ID (QFI) in both DL and UL packets. A single SDAP is configured for each individual PDU session, except for dual connectivity (DC) where two SDAP entities can be configured.

The functions of the PDCP sublayer include sequence numbering, header compression and decompression, transfer of user data, reordering and duplicate detection, PDCP packet data units (PDU) routing, retransmission of PDCP service data units (SDU), ciphering and deciphering, PDCP SDU discard, PDCP re-establishment and data recovery for RLC acknowledge mode (AM), duplication of PDCP PDUs.

The functions of the RLC layer depend on the transmission mode and include transfer of upper layer PDUs, sequence numbering independent of the one in PDCP, error correction through automatic repeat request (ARQ), segmentation and re-segmentation, reassembly of RL SDU, RLC SDU discard, RLC re-establishment.

The functions of the MAC layer include mapping between logical channels and transport channels, multiplexing/demultiplexing of MAC SDUs belonging to one or different logical channels into/from transport blocks (TB) delivered to/from the physical layer on transport channels, scheduling information reporting, error correction through hybrid ARQ, (HARQ), priority handling between UEs by means of dynamic scheduling, priority handling between logical channels of one UE by means of logical channel prioritization, padding. A single MAC entity can support one or multiple numerologies and/or TTI durations and mapping restrictions in logical channel prioritization controls which numerology and/or TTI duration a logical channel can use.

The functions of the physical Layer includes carrying all information from transport channels over physical channels. It takes care of link adaptation (AMC), power control, cell search (for initial synchronization and handover purposes) and other measurements for the RRC layer.

Some embodiments relate to uplink grant skipping in 5G NR but it will be understood that they are equally applicable to other radio access technologies.

Uplink grant is the process by which a user equipment is allocated resources for uplink transmission over an uplink physical channel, for example the physical uplink shared channel (PUSCH). The uplink grant can be dynamic in which case it may be received from a gNB over a downlink physical channel, for example the physical downlink control channel (PDCCH). The uplink grant can also be semi persistent or persistent in which case it may be configured by a gNB via RRC signalling. It should be noted that a semi-persistent grant may also be adapted dynamically by the gNB in which case the grant may be changed over a downlink physical channel, for example the PDCCH.

Uplink grant skipping is the process by which the user equipment does not use the allocated resources for uplink transmission (i.e. skips the use of the allocated resources), typically because there is no buffered data associated with any logical channel (i.e. there is no available data for transmission). Uplink grant skipping can be configured for dynamic, semi persistent and/or persistent independently for LTE.

Uplink grant skipping is always applied for semi-persistent and persistent when there is no buffered data associated with any logical channel, and is configurable for the dynamic grant.

So far, RAN2 has agreed the following.

RAN2 #97bis: Uplink grant skipping for dynamic grant should be configurable. It will be determined if uplink grant skipping for semi persistent grant should be configurable.

RAN2 #98: In 5G NR, when the user equipment is configured with semi persistent grant, the user equipment should always skip semi persistent grant if there is no data to transmit (i.e. skipping semi persistent grant is mandated in 5G NR regardless of semi persistent grant periodicity). Logical channel prioritization is performed the same regardless of whether the grant is dynamic or semi persistent. The user equipment will always at least skip semi persistent grant whenever it has no data to transmit. Furthermore, whether the user equipment is allowed to skip a dynamic grant is up to network configuration.

RAN2-NR #AH: A single logical channel can be mapped to one or more numerology/TTI duration. Logical channel to numerology/TTI length mapping can be reconfigured via RRC reconfiguration. A single MAC entity can support one or more numerology/TTI durations. Logical channel prioritization takes into account the mapping of logical channel to one or more numerology/TTI duration.

RAN2-NR #AH2: At least numerology and TTI length are included/taken into account for restriction for logical channel prioritization. A user equipment can be configured with logical channel prioritization where data of certain logical channel is not allowed to be mapped to certain type of grant available for uplink.

In LTE, the uplink grant skipping has been specified in MAC specification/3GPP TS 36.321 as follows:

If the MAC PDU includes only the MAC CE for padding BSR or periodic BSR with zero MAC SDUs and there is no aperiodic CSI requested for this TTI [2], the MAC entity shall not generate a MAC PDU for the HARQ entity in the following cases:

in case the MAC entity is configured with skip UplinkTxDynamic and the grant indicated to the HARQ entity was addressed to a C-RNTI; or in case the MAC entity is configured with skipUplinkTxSPS and the grant indicated to the HARQ entity is a configured uplink grant;

Whenever the condition holds in LTE, the padding BSR and periodic BSR would indicate a BS of zero for all logical channel groups. Hence, it makes sense to always skip the grant without MAC SDU.

A problem with uplink grant skipping for NR is that it is not only enforced when there is no buffered data associated with any logical channel. It can be enforced for other reasons, for example when the logical channel prioritization function prevents the transmission of buffered data associated with a logical channel on the allocated resources due to configured logical channel mapping restrictions.

A logical channel prioritization function is a function enforced in the MAC layer which prioritizes the transmission of a logical channel (e.g. URLLC) over the transmission of another logical channel (e.g. eMBB). Besides, logical channel mapping restrictions can be configured via RRC signalling such that allocated resources of a certain type (e.g. certain numerology or certain transmission duration) can only be mapped with certain logical channels (e.g. URLLC or eMBB).

For instance, the transmission of a logical channel conveying control plane data may be prioritized over the transmission of another logical channel conveying user plane data. In another example, the transmission of a logical channel conveying user plane data with more stringent latency requirement may be prioritized over the transmission of another logical channel. Further, these can be restricted to be mapped to allocated resources of certain type as explained above.

A problem is that a base station cannot infer whether uplink grant skipping is enforced because there is no buffered data associated with any logical channel or because the logical channel prioritization function prevents the transmission of buffered data associated with a logical channel due to the configured channel mapping restrictions. There may therefore be an ambiguity and the base station cannot take appropriate actions. For example, the base station may not decrease, maintain or increase the allocated resources appropriately. Likewise, the base station may not maintain or change the type of allocated resources appropriately.

Some embodiments may address this problem. These embodiments are described separately but it will be understood that they can be combined with one another.

Figure 4:
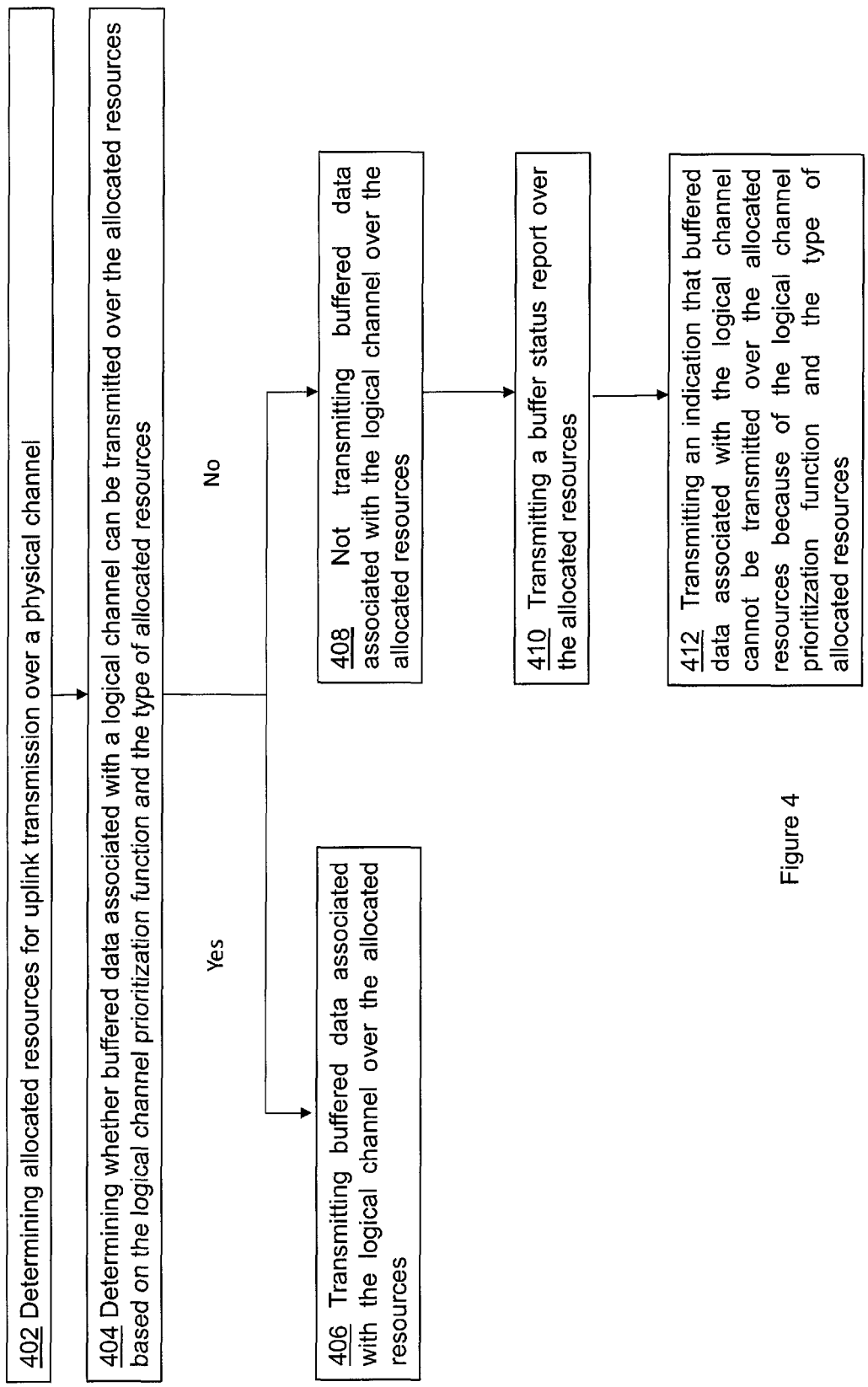
FIG. 4 illustrates a diagram of a method performed by a user equipment according to a first embodiment.

FIG. 4 illustrates a diagram of a method performed by a user equipment according to a first embodiment. In step 402, a user equipment obtains an uplink grant. As discussed above, the uplink grant may be dynamic in which case it may be received from a gNB over a downlink physical channel, for example the PDCCH. Alternatively, the uplink grant may be semi persistent or persistent in which case it may be configured via RRC signalling. The uplink grant indicates allocated resources to be used for uplink communication over an uplink physical channel, for example the PUSCH. It should be noted that a semi-persistent grant may also be adapted dynamically by the gNB in which case the grant may be changed over a downlink physical channel, for example the PDCCH.

In step 404, the user equipment (e.g. a MAC entity), first determines whether there is buffered data associated with a logical channel. The user equipment then determines whether this buffered data can be transmitted over the allocated resources based on one or more of a logical channel prioritization function with configured logical channel mapping restrictions and a type of allocated resources.

As discussed above, there may be buffered data associated with a logical channel but the logical channel cannot be mapped to the allocated resources due to the configured logical channel mapping restrictions. In this event, the logical channel prioritization function prevents the transmission of buffered data associated with the logical channel on the allocated resources.

If the user equipment determines that there is buffered data associated with a logical channel and determines that this buffered data can be transmitted over the allocated resources, the method goes to step 406.

In step 406, the user equipment transmits the buffered data associated with the logical channel to the gNB over the allocated resources. For example, the MAC entity delivers at least one MAC PDU to a PHY entity. The at least one MAC PDU includes the buffered data associated with the logical channel and a buffer status report (BSR), if triggered, indicating a remaining amount of buffered data associated with the logical channel.

If the user equipment determines that there is buffered data associated with a logical channel and determines that this buffered data cannot be transmitted over the allocated resources, the method goes to step 408.

In step 408, the user equipment does not transmit the buffered data associated with the logical channel to the gNB over the allocated resources. However, it does not mean that the allocated resources are skipped. Rather, in step 410 the user equipment transmits a BSR to the gNB over the allocated resources. For example, the MAC entity delivers at least one MAC PDU to the PHY entity. The at least one MAC PDU includes the BSR indicating non-zero value for BS for at least one logical channel or logical channel group (LCG). The at least one MAC PDU does not include buffered data associated with a logical channel, that is the at least one MAC PDU includes zero MAC SDU.

Uplink grant skipping is enforced only when the MAC PDU includes only BSR with BS indicating a zero value for all the LCGs and a zero MAC SDU. In certain example implementations, this enforcement may also be required to take the BSR trigger into account, being for instance, padding or a periodic BSR.

Example text for 38.321 could be as follow:
If the MAC PDU includes only the MAC CE for padding BSR or periodic BSR with BS indicating zero value for all LCGs with zero MAC SDUs, the MAC entity shall not generate a MAC PDU for the HARQ entity in the following cases:
in case the MAC entity is configured with skipUplinkTxDynamic and the grant indicated to the HARQ entity was addressed to a C-RNTI;
in case the grant indicated to the HARQ entity is a configured uplink grant.

In optional step 412, the user equipment may transmit an indication as to why buffered data associated with a logical channel cannot be transmitted over the allocated resources. For example, the MAC entity delivers at least one MAC PDU to the PHY entity. The at least one MAC PDU includes an indication that buffered data associated with the logical channel cannot be transmitted over the allocated resources because of the logical channel prioritization function with configured logical channel restrictions and the type of allocated resources.

In this way, the gNB receives information (i.e. the BSR and the indication) indicating that buffered data associated with a logical channel is available for transmission but cannot be transmitted due to the logical channel prioritization function with configured logical channel restrictions and the type of allocated resources. Hence, the gNB may take appropriate actions. For example, the gNB can decrease, maintain or increase the allocated resources. Likewise, the gNB can maintain or change the type of allocated resources.

It will be understood that the at least one MAC PDU of step 410 and the at least one MAC PDU of step 412 can be the same MAC PDU or different MAC PDUs.

Figure 5:
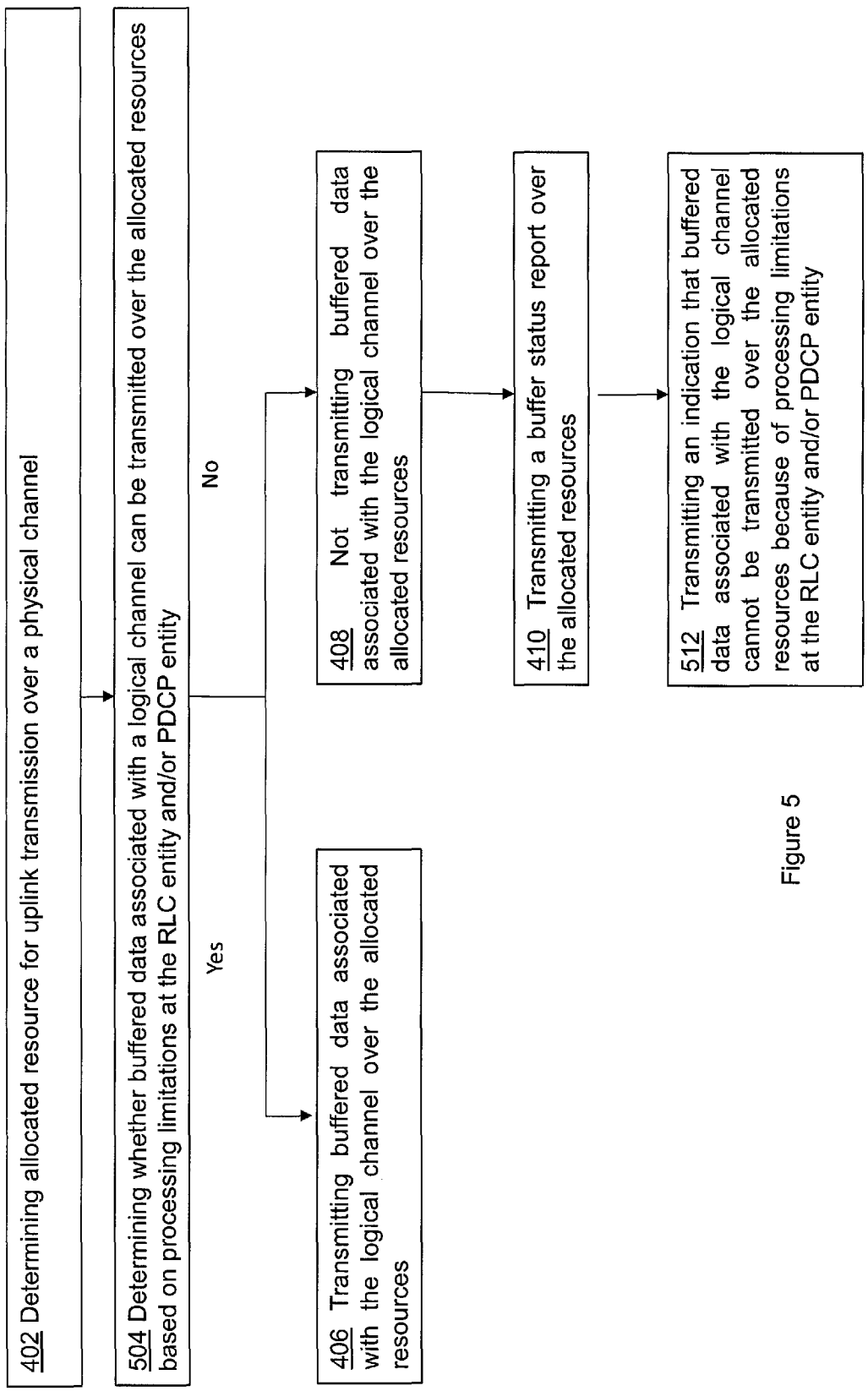
FIG. 5 illustrates a diagram of a method performed by a user equipment according to a second embodiment.

FIG. 5 illustrates a diagram of a method performed by a user equipment according to a second embodiment. The second embodiment is the same as to the first embodiment shown on FIG. 4 except that step 404 is replaced or supplemented by step 504 and step 412 is replaced or supplemented by step 512.

In step 504, the user equipment determines whether buffered data associated with a logical channel can be transmitted based on processing limitations at the RLC entity or processing limitations at the PDCP entity. For instance, in a dual connectivity scenario, data from a data radio bearer may be served by two separate cell groups through two separate logical channels/RLC entities. The user equipment may have pre-processed/pre-submitted PDCP PDUs to one of the RLC entity/logical channel while the uplink grant is received for another RLC entity/logical channel. The user equipment may not in this case be able to map the data to the allocated resources.

In optional step 512, the user equipment may indicate that buffered data associated with a logical channel cannot be transmitted because of processing limitations at the RLC entity or the PDCP entity.

Figure 6:
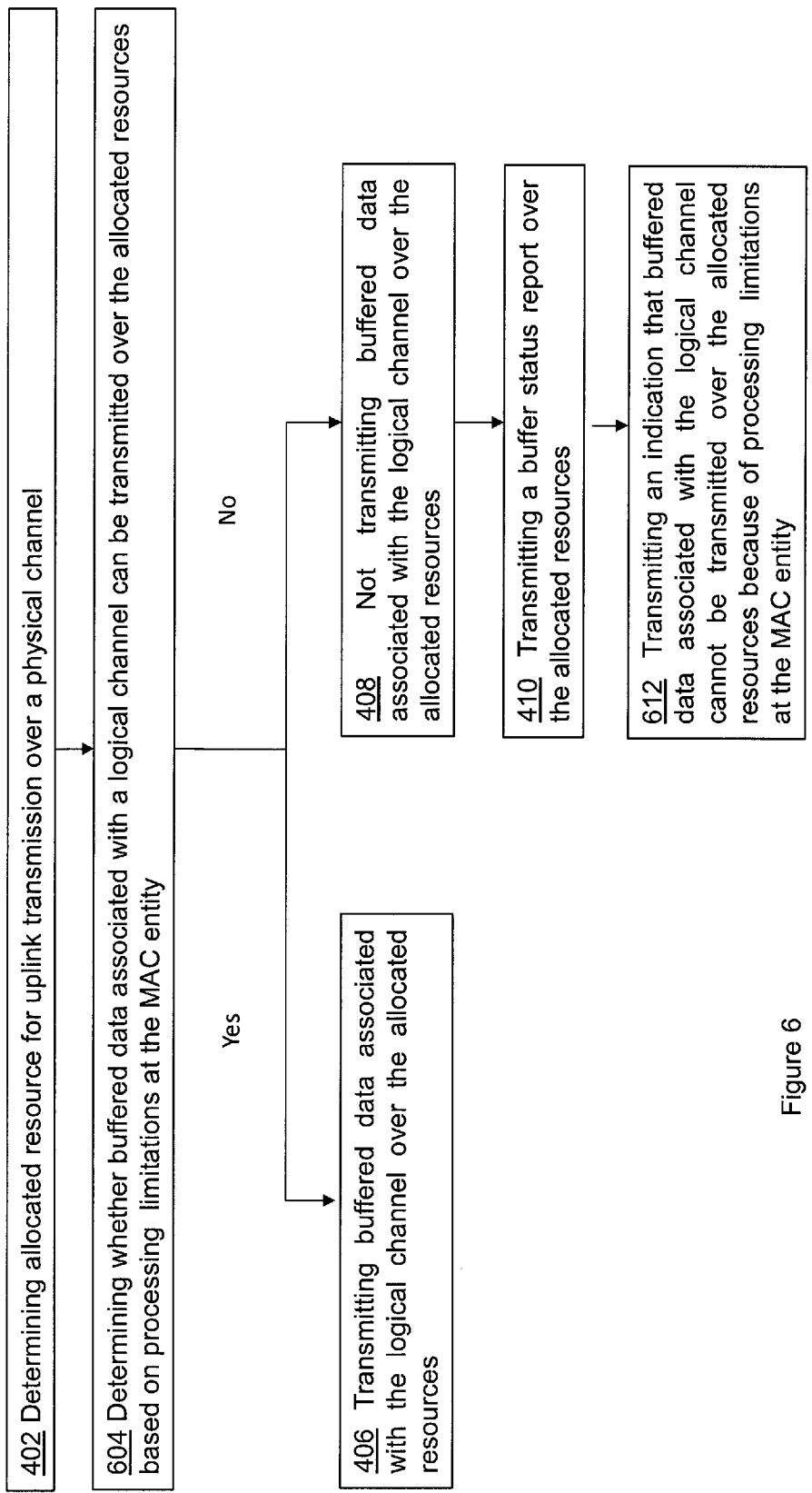
FIG. 6 illustrates a diagram of a method performed by a user equipment according to a third embodiment.

FIG. 6 illustrates a diagram of a method performed by a user equipment according to a third embodiment. The third embodiment is the same as the first embodiment shown on FIG. 4 except that step 404 is replaced or supplemented by step 604 and step 412 is replaced or supplemented by step 612.

In step 604, the user equipment determines whether buffered data associated with a logical channel can be transmitted based on processing limitations at the MAC entity.

In optional step 612, the user equipment may indicate that buffered data associated with a logical channel cannot be transmitted because of processing limitations at the MAC entity.

Figure 7:
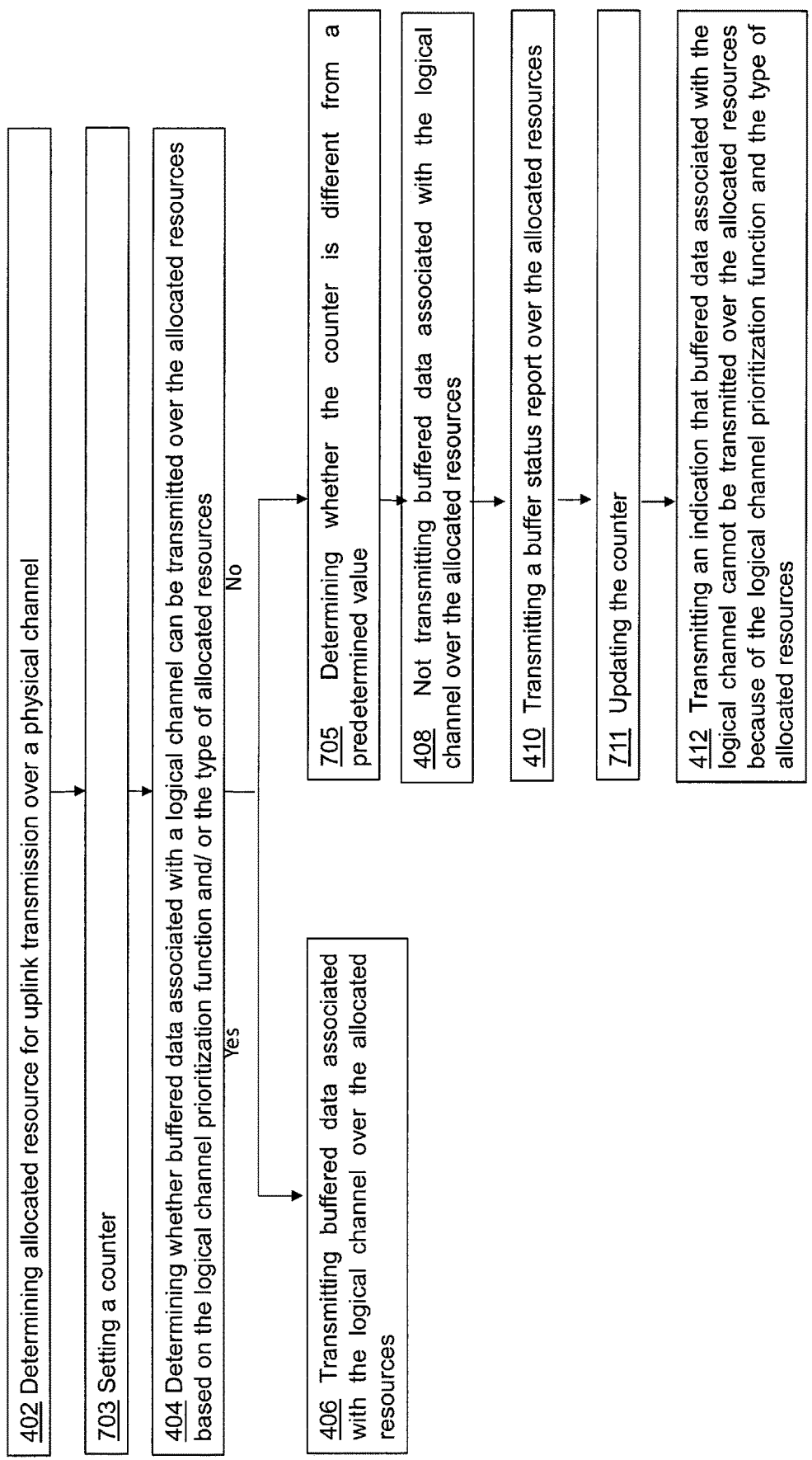
FIG. 7 illustrates a diagram of a method performed by a user equipment according to a fourth embodiment.

FIG. 7 illustrates a diagram of a method performed by a user equipment according to a fourth embodiment. The fourth embodiment is the same as the first embodiment shown on FIG. 4 except that steps 703, 705 and 711 are added.

In step 703, the user equipment sets a counter (that may be configured by RRC). In an example, the purpose of the counter is to track the number of times buffered data cannot be transmitted over the allocated resources (i.e. the number of times the user equipment transmits a MAC PDU with zero MAC SDU and a BSR with non-zero BS value for any logical channel/LCG over the allocated resources). It will be understood that the counter can be a count up counter or a count down counter.

In step 705, the user equipment compares the counter with a predetermined value (e.g. 5). When the counter is different from (small or greater than) the predetermined value, the user equipment goes to steps 408 and 410.

In steps 408 and 410, if buffered data cannot be transmitted based on the logical channel prioritization function with configured logical channel mapping restrictions and the type of allocated resources, a MAC PDU with BSR with non-zero BS value and zero MAC SDU is transmitted over the allocated resources.

In step 711, the counter is updated (i.e. incremented or decremented).

In step 705, when the counter is equal to the predetermined value, the user equipment does not go to steps 408 and 410. That is, the user equipment does not transmit a MAC PDU with BSR with non-zero BSR and zero MAC SDU. Instead, the user equipment skips the allocated resources.

Alternatively or in supplement, a counter may track the number of times the user equipment skips the allocated resources since the last transmission of a MAC PDU with BSR with non-zero BS value and zero MAC SDU over the allocated resources. The user equipment may skip the allocated resources for a predetermined number of times (e.g. 3 allocated resources) when buffered data cannot be transmitted over the allocated resources (i.e. when no MAC SDU can be included in the MAC PDU). When the counter reaches the predetermined value the user equipment may be allowed to transmit again a MAC PDU with BSR with non-zero BS value and zero MAC SDU over the allocated resources if there is still no buffered data associated with a logical channel to be transmitted.

Figure 8:
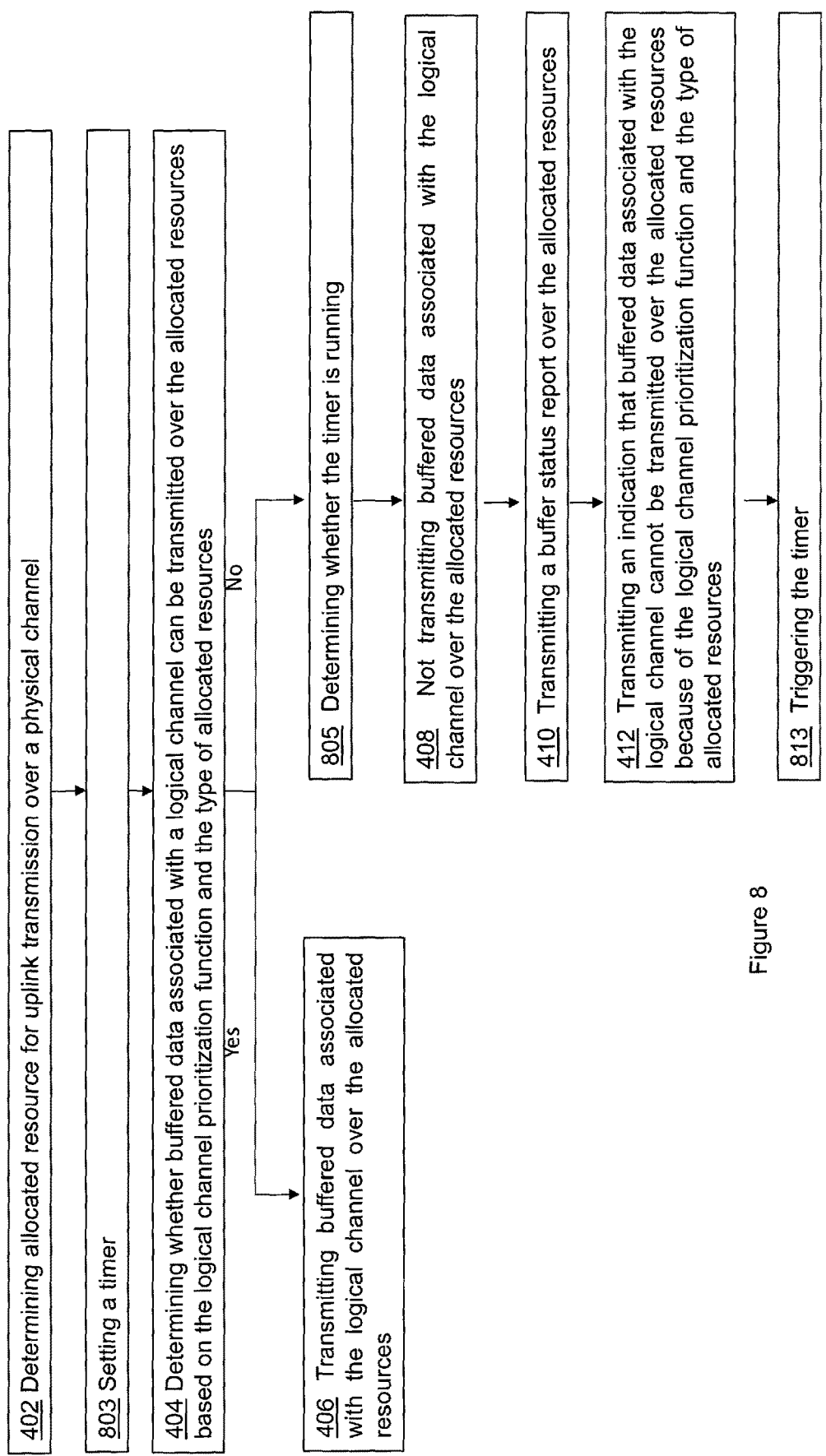
FIG. 8 illustrates a diagram of a method performed by a user equipment according to a fifth embodiment.

FIG. 8 illustrates a diagram of a method performed by a user equipment according to a fifth embodiment. The fifth embodiment is identical to the first embodiment shown on FIG. 4 except that steps 803, 805 and 813 are added.

In step 803, the user equipment sets a timer. The purpose of the timer is to track a maximum duration for skipping the allocated resources. It will be understood that the timer can be a count up timer or a count down timer.

In step 805, the user equipment determines if the timer is running. When the timer is not running the user equipment goes to steps 408 and 410.

In steps 408 and 410, a MAC PDU with BSR with non-zero BS value and zero MAC SDU is transmitted.

In step 813, the timer is started. The user equipment then skips the allocated resources as long as the timer is running (and as long as buffered data associated with a logical channel cannot be transmitted). In other words, the user equipment does not transmit a MAC PDU with non-zero BSR without MAC SDU as long as the timer is running (and as long as buffered data associated with a logical channel cannot be transmitted). When the timer expires and buffered data associated with a logical channel cannot be transmitted, the user equipment transmits a MAC PDU with non-zero BSR without MAC SDU, resets the timer and triggers the timer.

Equally, when the timer is running and buffered data associated with a logical channel can be transmitted, the user equipment stops skipping the allocated resources. The user equipment transmits a MAC PDU with non-zero MAC SDU and stops and resets the timer.

In step 805, when the timer is running the user equipment does not go to steps 408 and 410. The user equipment keep skipping the allocated resources.

Figure 9:
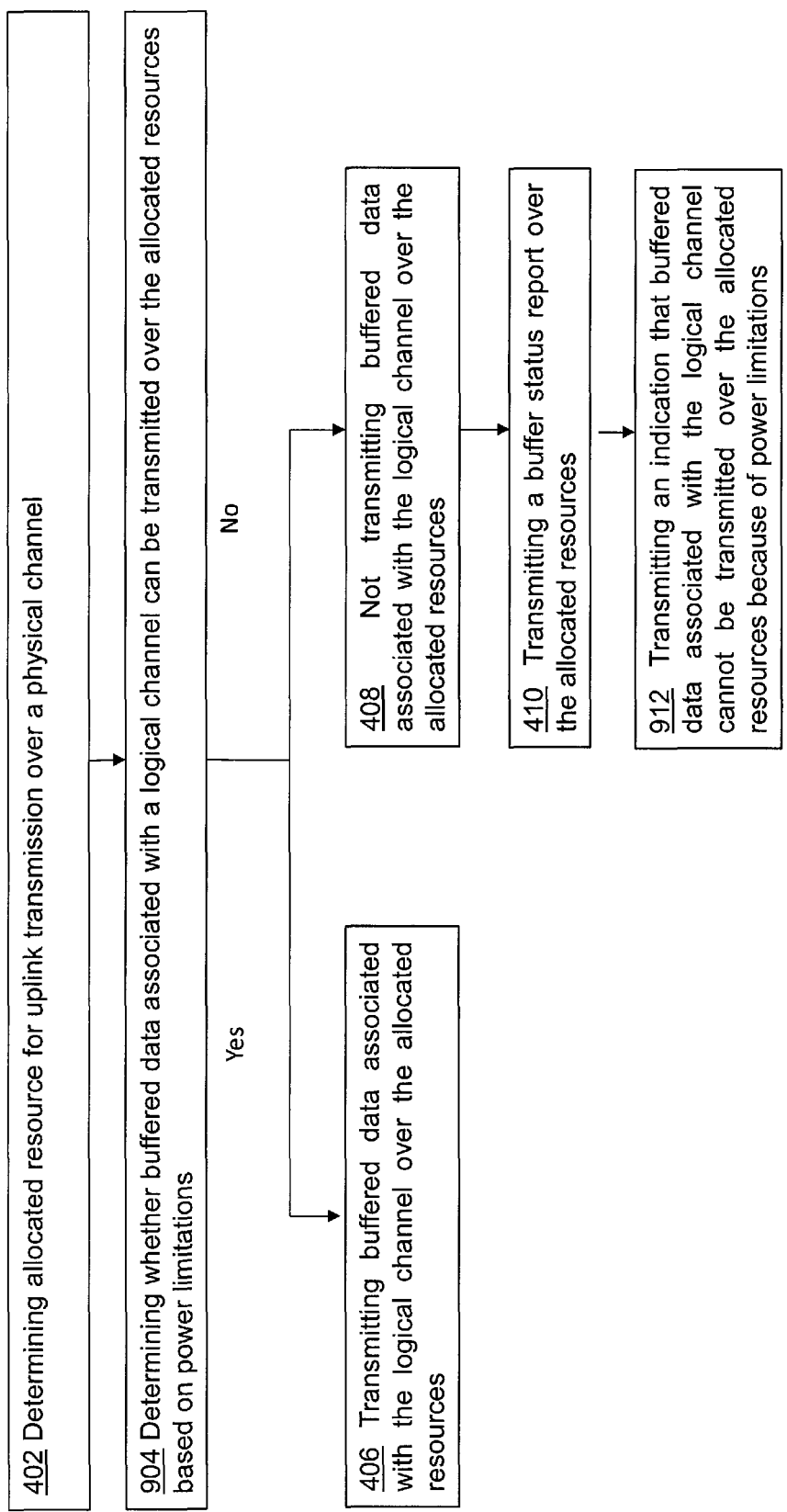
FIG. 9 illustrates a diagram of a method performed by a user equipment according to a sixth embodiment.

FIG. 9 illustrates a diagram of a method performed by a user equipment according to a sixth embodiment. The sixth embodiment is the same to the first embodiment shown on FIG. 4 except that step 404 is replaced or supplemented by step 904 and step 412 is replaced or supplemented by step 912.

In step 904, the user equipment determines whether buffered data associated with a logical channel can be transmitted based on power limitations at the user equipment. For example, if the user equipment has low battery power or is in a power saving mode, the user equipment may determine that buffered data associated with a logical channel cannot be transmitted. By contrast, if the user equipment has high battery power or is not in a power saving mode, the user equipment may determine that buffered data associated with a logical channel can be transmitted.

In step 912, the user equipment indicates that buffered data associated with a logical channel cannot be transmitted because of power limitations.

Figure 10:
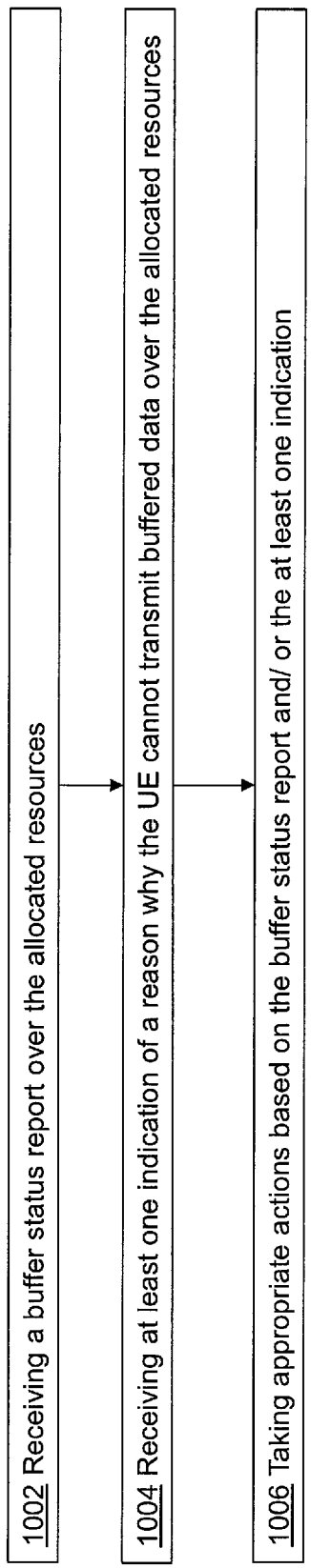
FIG. 10 illustrates a diagram of a method performed by a base station according to the first, second, third, fourth, fifth and sixth embodiments.

FIG. 10 illustrates a diagram of a method performed by a gNB according to the first, second, third, fourth, fifth and sixth embodiments. The method is complementary to the methods described above and therefore is not described in detail.

In step 1002, the gNB receives the buffer status report over the allocated resources (i.e. the buffer status transmitted by the user equipment in step 402).

In step 1004, the gNB receives the indication as to why the UE has enforced uplink grant skipping (i.e. the indication is transmitted by the user equipment in step 412, 512, 612, 712, 812 and/or 912). For example, the reason may be one or more of logical channel prioritization function with configured logical channel restrictions and a type of allocated resources, processing limitations at the MAC entity, processing limitations at the PDCP entity, processing limitations at the RLC entity and/or power limitations).

It will be understood that in the event that more than one reason needs to be reported the user equipment could report all of them or only one of them, for example based on a priority order.

In step 1006, the gNB takes appropriate actions based on the buffer status report and/or the indication. For example, the gNB decreases, maintains or increases the allocated resources. Alternatively or in addition, the gNB maintains or changes the type of allocated resources.

Figure 11:
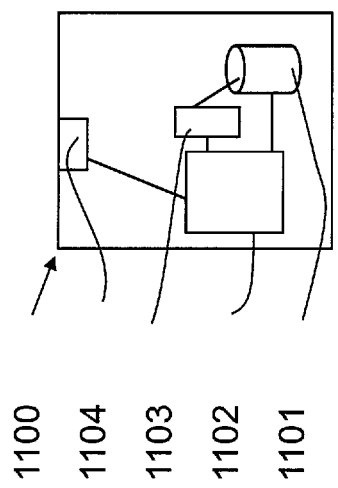
FIG. 11 illustrates a control apparatus.

FIG. 11 shows an example of a control apparatus 1100 that may perform the method shown in FIG. 10. The method may be implanted in a single control apparatus or across more than one control apparatus. The control apparatus may be integrated in a gNB. The control apparatus 1100 can be arranged to provide control on communications in a service area of the system. The control apparatus 1100 comprises at least one memory 1101, at least one data processing unit 1102, 1103 and an input/output interface 1104. Via the interface the control apparatus 1100 can be coupled to a receiver and a transmitter of the gNB. The receiver and/or the transmitter may be implemented as a radio front end or a remote radio head. For example the control apparatus 1100 can be configured to execute an appropriate software code to provide the control functions.

Some embodiments may provide one or more advantages. In particular, they allow the gNB to avoid ambiguity about the user equipment buffer situation when both uplink grant skipping and the logical channel prioritization function are enforced. More generally, they allow the gNB to determine the reason why uplink grant skipping has been enforced and to take appropriate actions. They also allow the user equipment to save power if uplink grant skipping is enforced when it is "safe" (e.g. when with very high probability one of the buffer status reports has reached the gNB).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptions may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
    determining, based on a logical channel prioritization function, processing limitations or power limitations indicated by a user equipment, that buffered data is available for transmission and cannot be transmitted over allocated resources; and
    causing information indicating that buffered data is available for transmission and cannot be transmitted over allocated resources to be transmitted over the allocated resources.

2. The method of claim 1, wherein the information includes a buffer status report.

3. The method of claim 1, wherein the buffered data is associated with a logical channel.

4. The method of claim 1, wherein the logical channel prioritization function is configured with at least one logical channel mapping restriction on a type of allocated resources.

5. The method of claim 4, wherein the determining is based on a type of the allocated resources.

6. A computer program embodied on a non-transitory computer-readable storage medium, the computer program comprising program code for controlling a process to execute a process, the process comprising the steps of the method of claim 1.

7. An apparatus comprising at least one processor and at least one memory including a computer program code, the at least one memory and the computer program code configured to, with the at least one processor, cause the apparatus at least to:
- determine, based on a logical channel prioritization function, processing limitations or power limitations indicated by a user equipment, that buffered data is available for transmission and cannot be transmitted over allocated resources; and
- cause information indicating that buffered data is available for transmission and cannot be transmitted over allocated resources to be transmitted over the allocated resources.

\* \* \* \* \*